Patented May 26, 1931

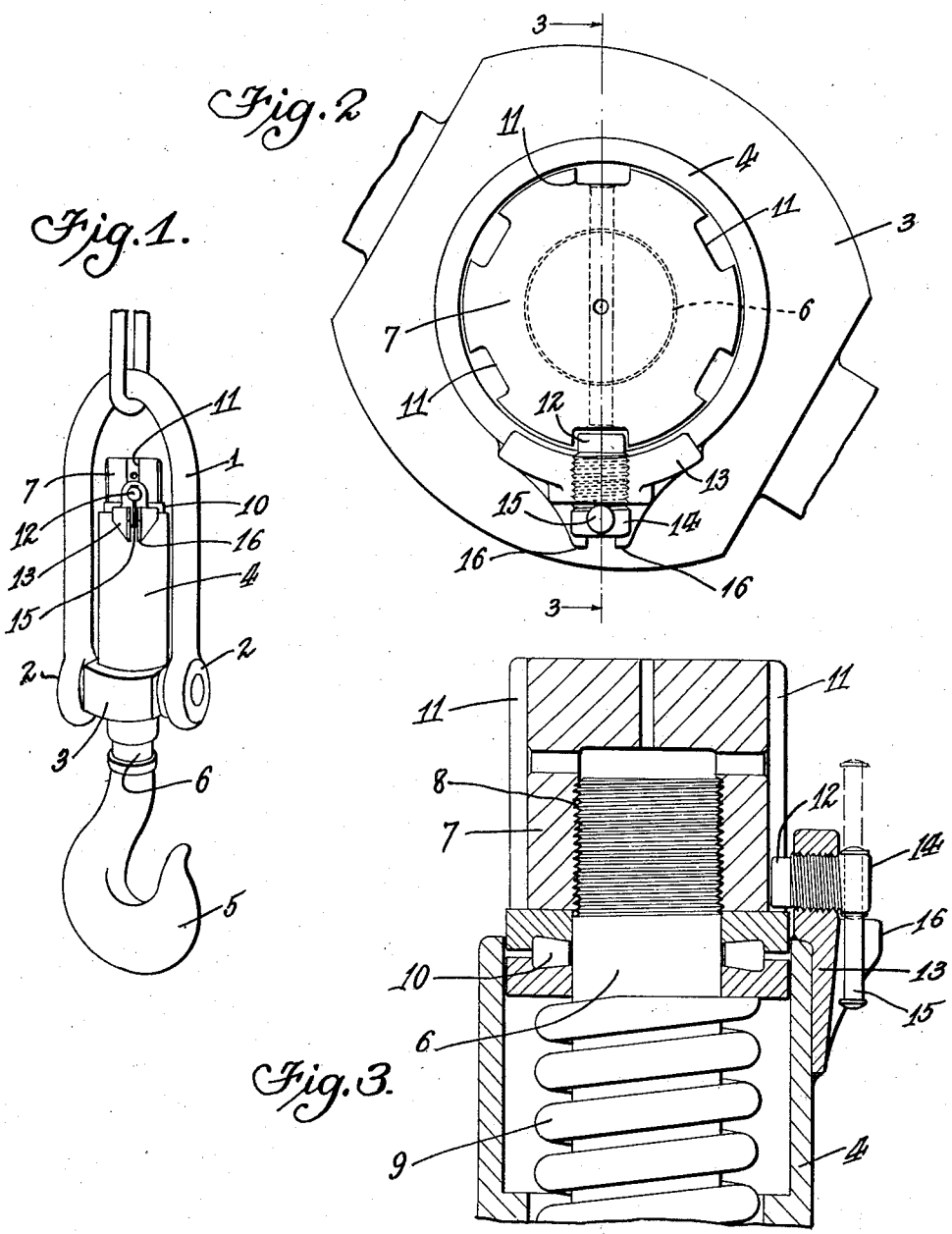

1,806,908

UNITED STATES PATENT OFFICE

SPENCER WILLIAM LONG, OF REDONDO BEACH, CALIFORNIA, ASSIGNOR, BY MESNE ASSIGNMENTS, TO THE NATIONAL SUPPLY COMPANY, OF TOLEDO, OHIO, A CORPORATION OF OHIO

LOCKING DEVICE FOR SPRING HOOKS

Application filed April 21, 1930. Serial No. 445,946.

This invention relates to a lock means for spring casing hooks, and especially to a lock means for that type of hook employed in the operation and construction of oil and gas wells for supporting the casing drill pipe and the like during the drilling operations of the well. The lock means forming my present invention is an improvement over the bar latch for spring casing hooks disclosed in the Edward Timbs Patent No. 1,611,393 of December 21, 1926.

It is an object of my invention to provide a locking means adapted for use in holding the hook from rotation relative to the supporting bails, and which locking means are easily disengageable when desired to permit the hook to rotate in any particular or desired position during the drilling operation.

Another object of this invention is to provide a locking means which includes a lock bolt which is threaded to an extension of the casing of the spring of the hook and is adapted to engage the cap of the hook and slot formed therein to hold the hook from rotation relative to the casing, and which is adapted to be locked in adjusted position.

Other objects and advantages of this invention it is believed will be apparent from the following detailed description of a preferred embodiment thereof as illustrated in the accompanying drawings:

In the drawings:

Figure 1 is a perspective view of a spring casing hook including lock means embodying my invention.

Figure 2 is a fragmental top plan view thereof illustrating the lock means as engaged to prevent rotation of the hook relative to the bails or casing of the hook.

Figure 3 is a fragmental sectional view taken substantially on the line 3—3 of Figure 2.

In the preferred embodiment of my invention illustrated in the accompanying drawings, 1 illustrates a bail which is adapted to be secured to the rotary hoist cable in any suitable or desirable manner, and which bail 1 terminates in eyes 2. Journaled in the eyes 2 is a swivel bearing block 3 having a bore formed therethrough within which the sleeve or casing 4 is supported in any suitable or desirable manner, as is particularly illustrated in the patent to Edward Timbs, No. 1,611,393.

The hook 5 may be of any desired form and is provided with a shank 6 which extends through the sleeve or casing 4 and is provided at its upper end with a spring hook shank cap 7. The cap 7 is screw-threaded to the upper end of the shank 6 as illustrated at 8. A spring 9 is mounted on the shank 6 between the bearing 10 and the bearing block 3 and normally holds the hook 5 in the position illustrated in Figures 1 and 3 except when the hook 5 is provided with a large load sufficient to compress the spring 9. When a section of drill stem is disconnected from the remaining portion of the drill stem, the spring will operate to raise the said section from the remainder of the drill stem, preventing engagement with the threads, and when the section is thus released, it is desirable that means be provided for preventing rotation of the hook 5 relative to the bail 1.

Means are required for preventing rotation of the hook during drilling operations. During drilling the entire drill stem is suspended from a swivel which is made to take care of the rotation of the drill stem. The swivel is secured directly to the hook and it is essential that the hook does not rotate during this operation. In order to prevent the hook 5 during drilling operations, also when a section of drill stem connected thereto, from rotating freely in the well derrick when it is released from the remainder of the drill stem, the cap 7 is provided with a plurality of slots or grooves 11 which extend longitudinally of the cap 7 and into any one of which slots 11 a lock bolt 12 is adapted to be positioned. The lock bolt 12 is screw-threaded to a bracket 13 secured to the upper end of the casing 4. The bolt 12 is provided at its outer end with a vertically extending boss 14, into which a handle 15 is slidably mounted. The handle 15 is adapted to fit between lugs 16 which are preferably formed integral with the bracket 13 to lock the bolt 12 in adjusted position. In screw-threading the bolt 12 in the bracket 13, the handle 15 is maintained from between the lugs 16 in the position indicated by the dotted lines in Figure 3, and is allowed to drop between the lugs 16 when the bolt 12 has been screw-threaded into position in the desired groove 11.

It is obvious from the foregoing that I have provided a simple and improved form of a lock means for a spring casing hook which may easily be engaged or released for locking the hook 5 from rotation in relation to the bail 1, and which locking means may be engaged at a plurality of positions of the hook 5 without requiring the hook 5 to be rotated to a predetermined definite position.

Having fully described my invention, it is to be understood that I do not wish to be limited to the details herein set forth which may obviously be varied without departing from the spirit of my invention and without departing from the following claims.

I claim:

1. In a rotation lock for well casing hook, the combination of a lock bolt, a cap having a longitudinally extending groove formed therein, into which the lock bolt is adapted to be adjusted, means for adjusting the lock bolt in position, and means adapted to engage the latter said means and hold the lock bolt in adjusted position.

2. In combination with a well casing hook including a hook, a bearing block in which the hook is rotatably mounted, a bail secured to the bearing block, a casing secured to the bearing block and surrounding the shank of the hook, a lock bolt screw-threaded to the casing and adapted to engage the shank of the hook, to hold the hook from rotation relative to the casing, means carried by the lock bolt for adjusting the same into engaging position, and means adapted to engage the latter said means and hold the lock bolt in engaging position.

3. In combination with a well casing hook comprising a hook having a shank, a body, spring means yieldably supporting the hook on said body, and hoisting bails secured to the body, of a locking bolt, a cap secured to the shank of the hook and having a plurality of longitudinally extending grooves formed therein, into any one of which grooves the said locking bolt is adapted to be inserted, means for adjusting the locking bolt into position to pass into any one of said grooves, and means for releasably holding the locking bolt in adjusted position.

4. In a rotation lock for well casing hooks, the combination of a locking bolt, a cap having a plurality of longitudinally extending grooves formed in its outer periphery, a lock bolt which is adapted to be engaged in any one of said grooves, the cap being secured to the said hook, means for adjusting the locking bolt into engaging position, and means carried by the hook for holding the locking bolt in adjusted position.

5. In combination with a well casing hook comprising a hook having a shank, a body, spring means yieldably supporting the said hook on said body, and hoisting bails secured to said body, of a locking bolt, a cap secured to the shank of said hook and having a plurality of longitudinal grooves formed therein into any one of which the said locking bolt is adapted to be inserted in any position of the hook in relation to the bail, a casing secured in position relative to the bail, means supported by the casing into which the locking bolt is screw-threaded, and means supported by the casing for holding the locking bolt in adjusted position.

Signed at Torrance, Cal., this 14th day of April, 1930.

SPENCER WILLIAM LONG.